3,315,781
LOADING CONVEYOR

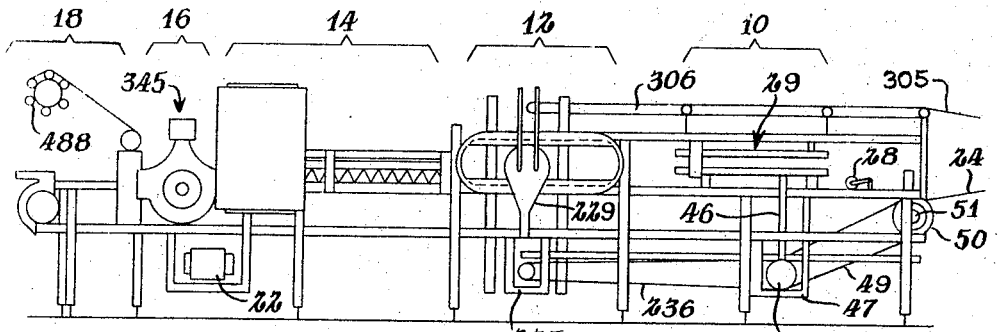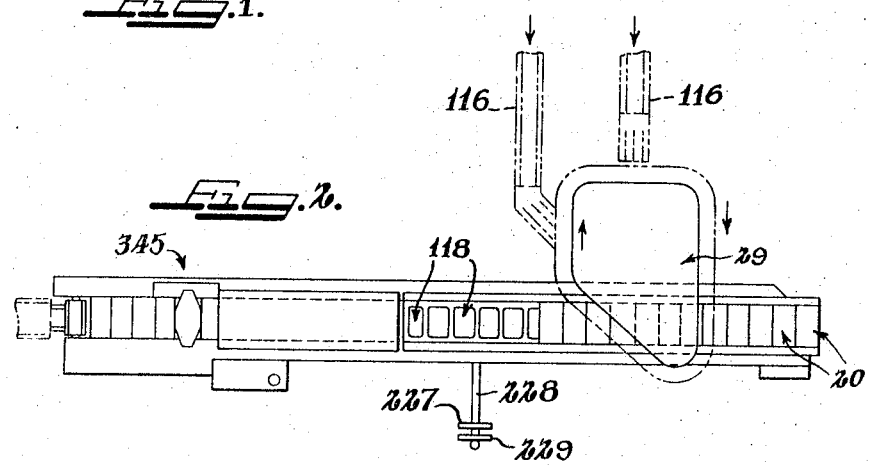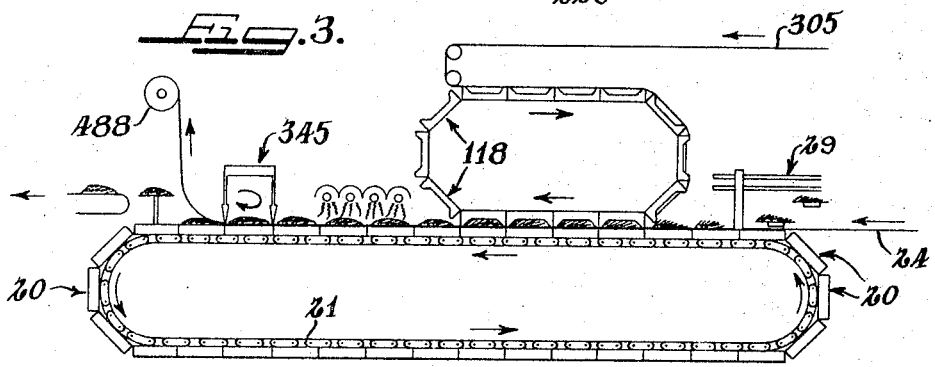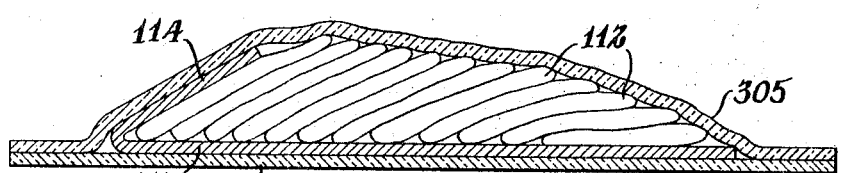

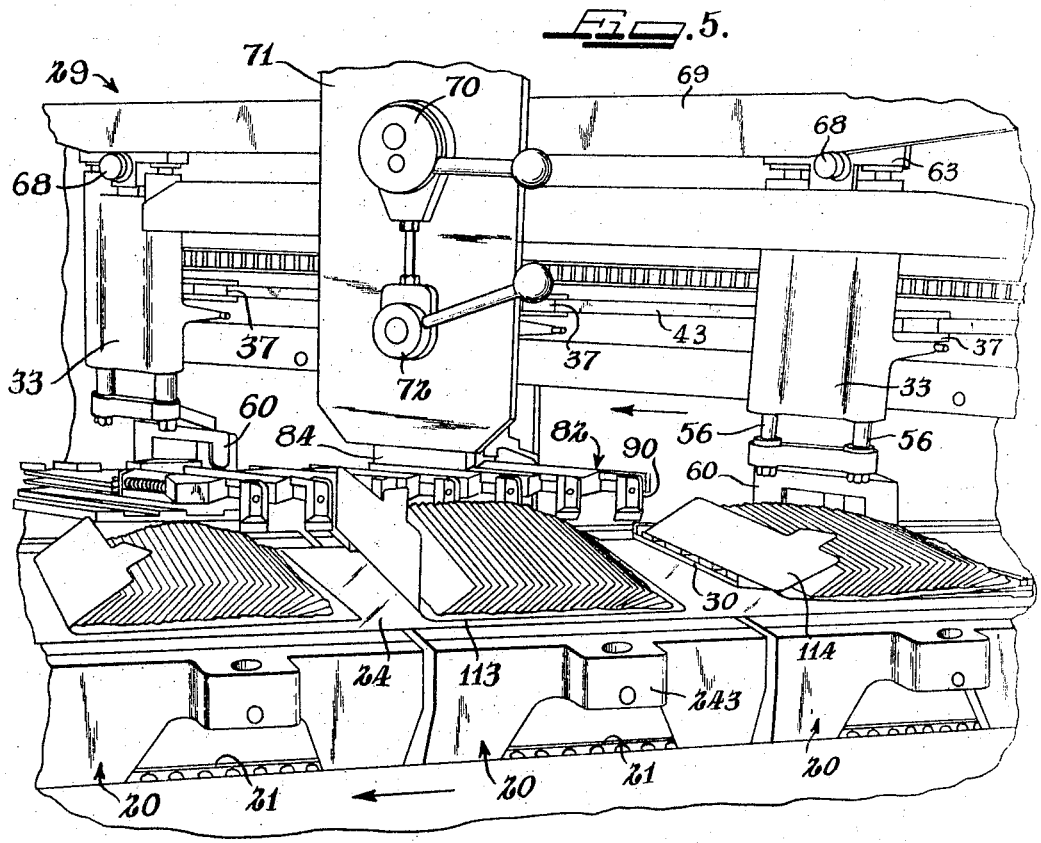

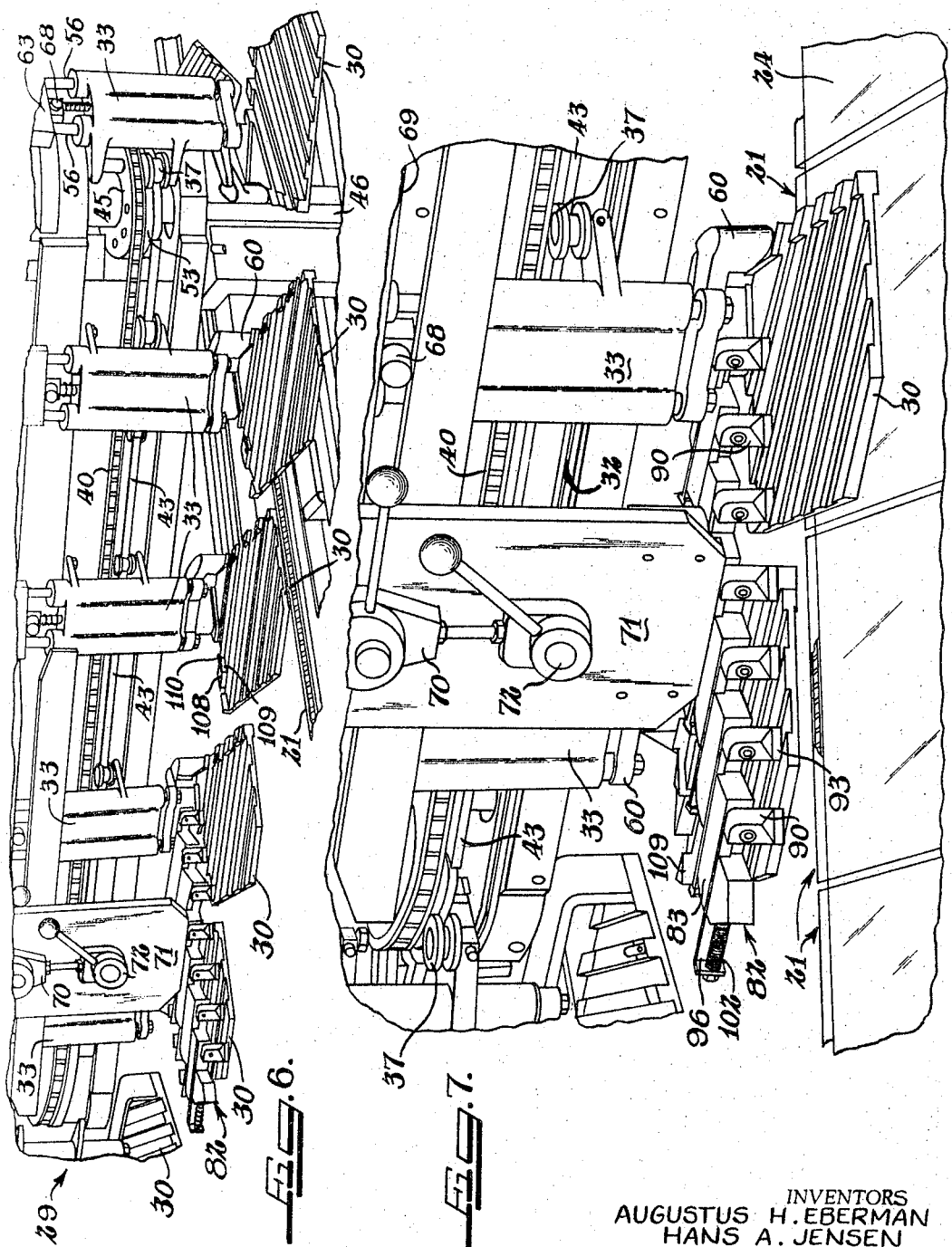

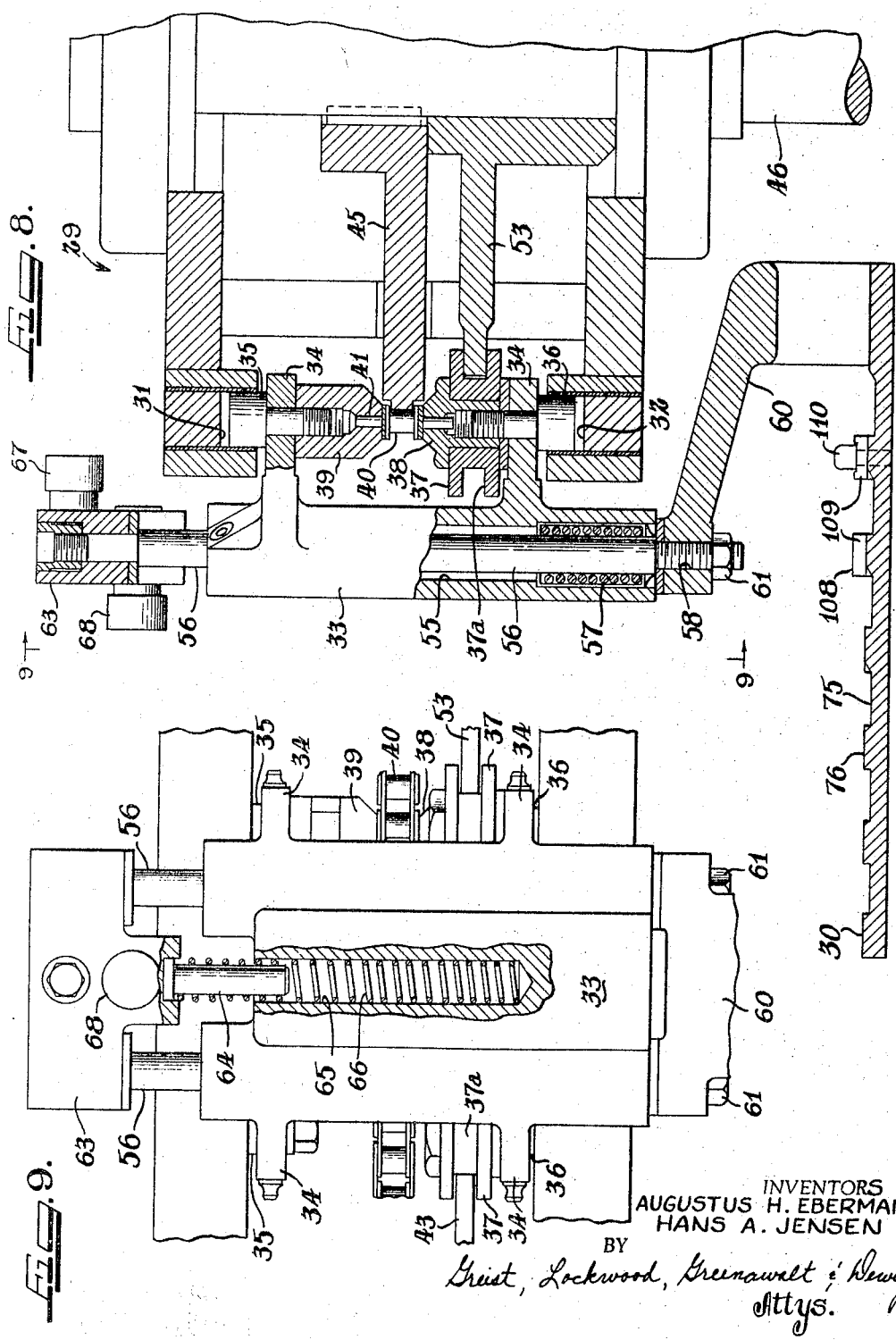

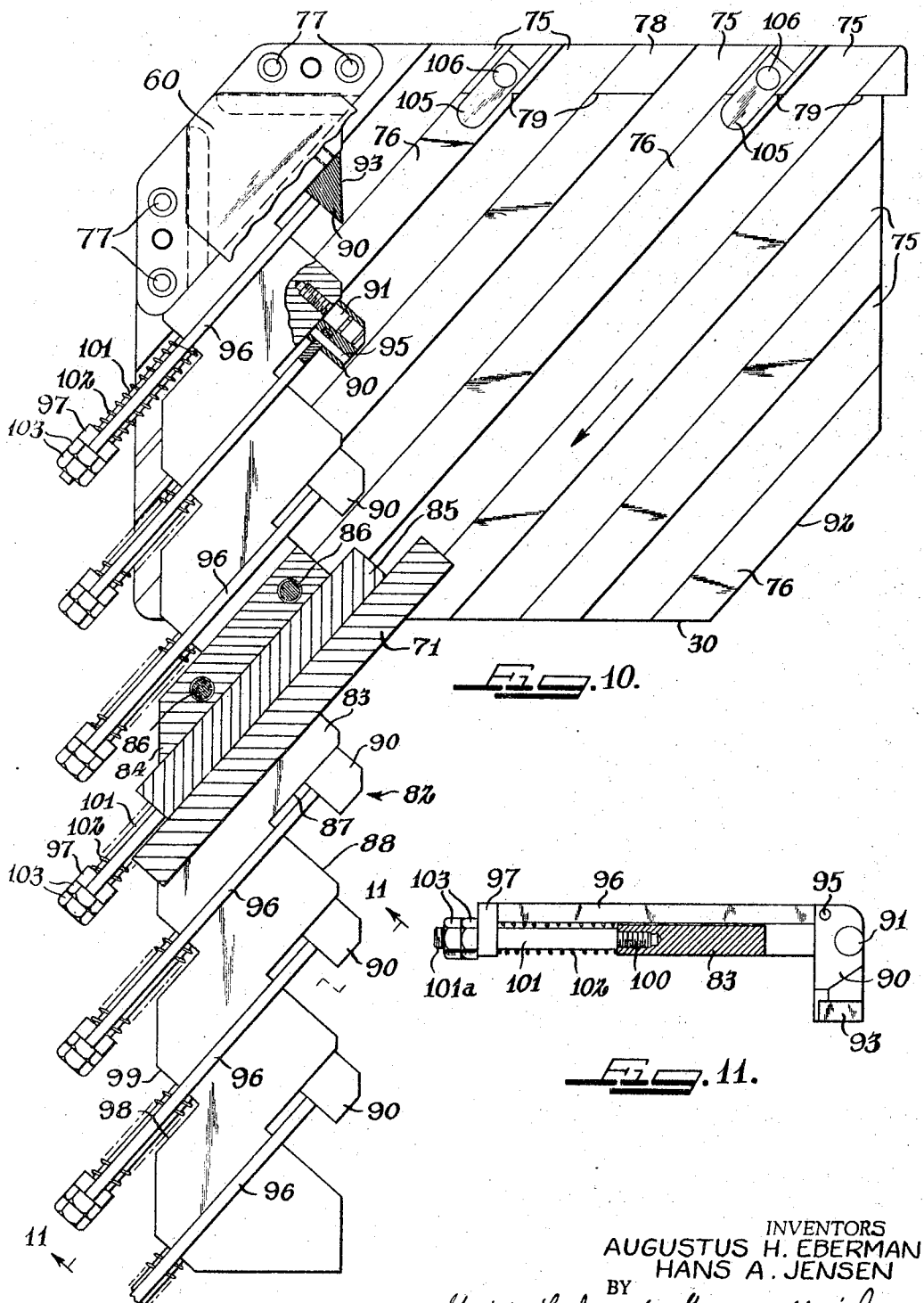

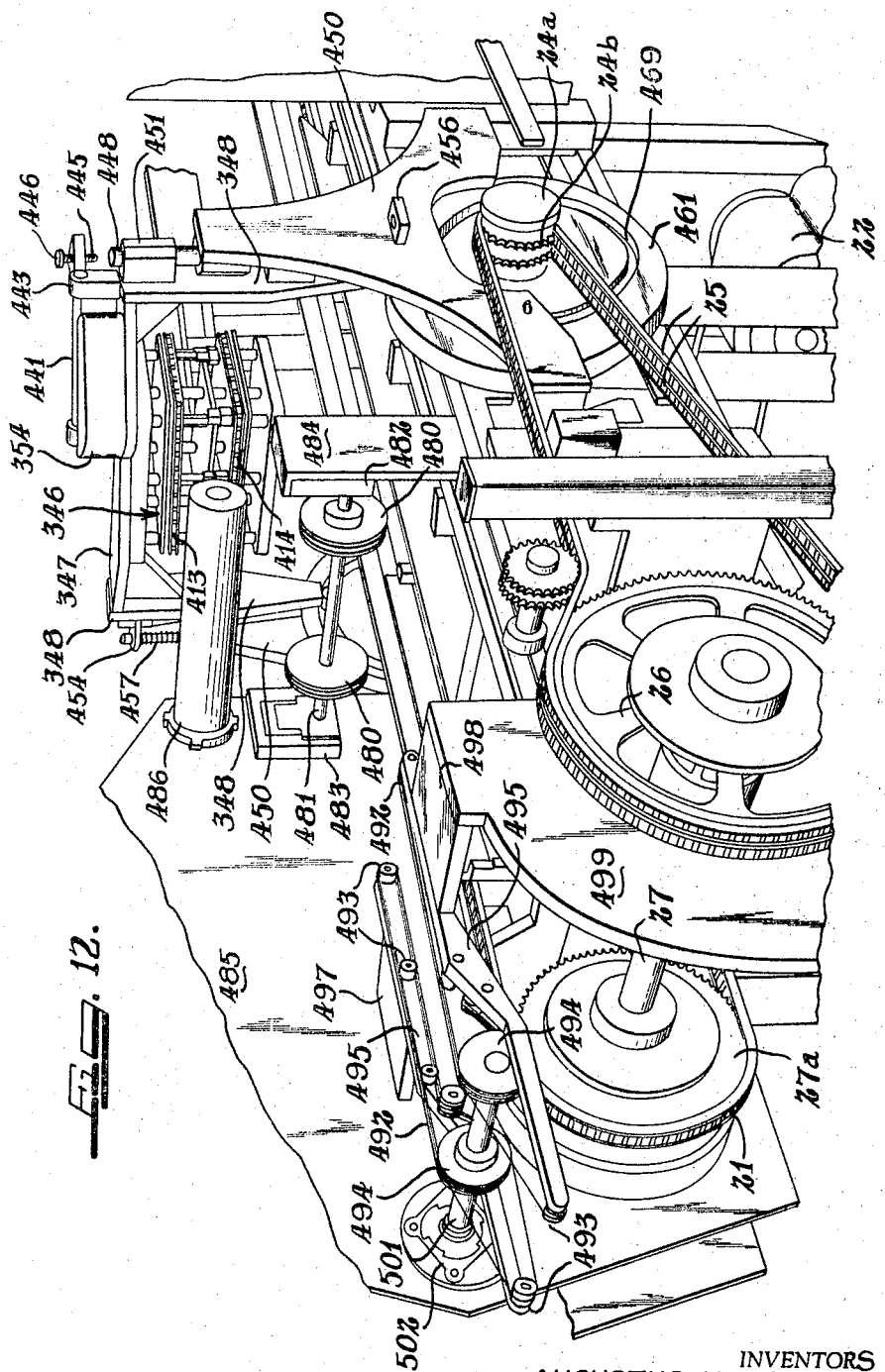

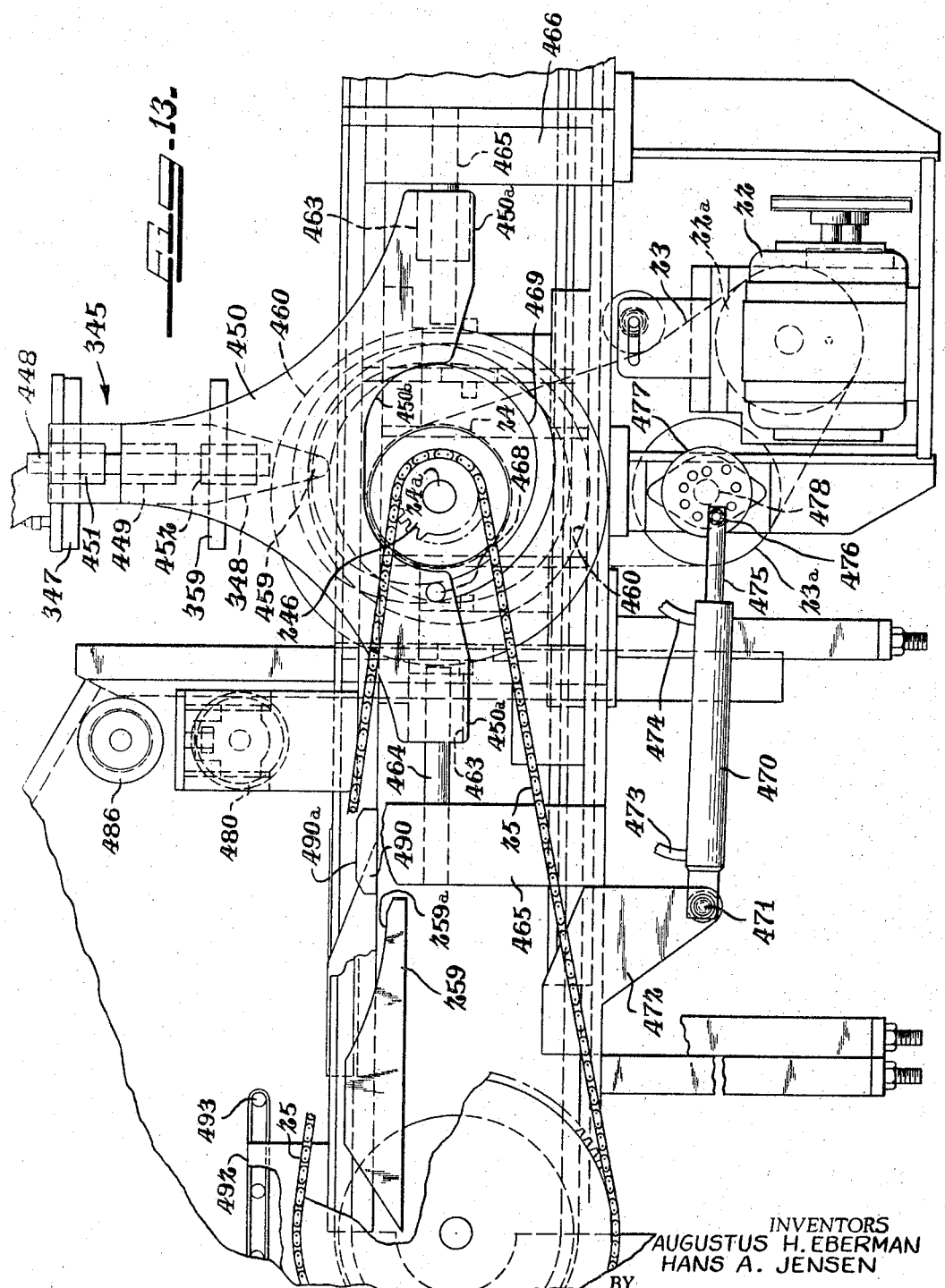

Augustus H. Eberman and Hans A. Jensen, both of Madison, Wis., assignors to Oscar Mayer & Co., Inc., Chicago, Ill., a corporation of Illinois
Original application July 31, 1963, Ser. No. 299,000. Divided and this application Apr. 25, 1966, Ser. No. 560,390
6 Claims. (Cl. 198—28)

This application is a division of our application Ser. No. 299,000, filed July 31, 1963.

This invention relates generally to material handling equipment and more particularly to a new and improved loading conveyor adapted for particular although not exclusive application with a package forming machine by which hermetically sealed packages containing food products or other articles may be automatically and continuously formed.

A primary object of the present invention is the provision of a new and improved article handling mechanism including unique loading conveyor means which successively and accurately deposit articles on another associated but separate conveyor.

A further object of the invention is to provide in a package forming machine of the type described above, new and improved means for successively and accurately depositing articles to be packaged on a conveyor which forms a part of the machine.

These and other objects and advantages of the present invention will become apparent from the following specification wherein like numerals refer to similar parts throughout.

In the drawings:

FIG. 1 is a side elevational view, in semi-diagrammatic form, of a continuous package forming machine with which the present invention may be associated;

FIG. 2 is a top plan view of the machine of FIG. 1 with certain parts of the machine being removed for better illustration of the invention;

FIG. 3 is a diagrammatic view showing the operation of the machine;

FIG. 4 is a vertical section taken through a sealed package formed by the machine;

FIG. 5 is a perspective view of the loading conveyor means of this invention for successively depositing articles to be packaged on the lower die plates of the machine;

FIG. 6 is a perspective view similar to FIG. 5 but showing the loading conveyor means unloaded and the lower die plates removed;

FIG. 7 is a close-up perspective view similar to FIG. 6 showing the stripper means which cooperates with the loading conveyor means for removal of articles from the latter for transfer to the lower die plates;

FIG. 8 is an enlarged fragmentary vertical section taken through one of the tray assemblies of the loading conveyor means;

FIG. 9 is a section taken along line 9—9 of FIG. 8;

FIG. 10 is an enlarged top plan view, with certain parts removed, showing certain of the stripper fingers engaging grooves in one of the trays of the loading conveyor means;

FIG. 11 is a section taken along the line 11—11 of FIG. 10;

FIG. 12 is a perspective view of the downstream end of the machine with many parts of the machine being broken away or removed for purposes of better illustration of other parts thereof; and FIG. 13 is a fragmentary side view of the downstream end of the machine, as seen from the left (looking downstream), with certain parts of the machine not being shown for purposes of better illustration of other parts.

Briefly and by way of introduction, the continuous package forming machine includes a lower endless series of die plates for receiving a polyvinylidene chloride film or the like from film extrusion and film super-cooling equipment and for advancing the film on the faces of the lower die plates in a horizontal linear path. In effect, the lower series of die plates act as a conveyor for advancing a film, hereinafter referred to as the lower film, through the entire machine. The present invention has to do with means in the form of a separate loading conveyor provided for successively and accurately depositing articles to be packaged in longitudinal spaced-apart relation on the advancing lower film so that the articles are positioned on the film in proper relation with the lower die plates. In the embodiment of the machine shown for purposes of illustration, the articles to be packaged are shown in the form of groups of bacon strips lying on each other in overlapping relation. Of course it is to be realized that the invention is not to be limited to the particular articles handled.

Referring now to the drawings and in particular FIG. 1, the continuous package forming machine primarily includes, in serial relation progressing along the direction of travel of the films or in a "downstream" direction, a loading zone 10, a packaging zone 12, a crystallization zone 14, a cutting zone 16 and a scrap film wind-up and package delivery zone 18. The rectangular object diagrammatically illustrated in FIG. 1 in zone 14 represents an electrical junction box for controlling electrical components of the machine, such as the drive motors thereof. Before describing the equipment comprising loading zone 10 which includes the present invention, the lower die plates of the machine will be briefly described because of the interrelation of the loading zone equipment with the lower die plates.

The lower die plate means include an endless series of die plates 20 each being supported for movement in an endless path by rollers guided in trackways which form a part of the supporting structure of the continuous package forming machine. Lower die plates 20 are articulated on a pair of endless chains 21 (FIG. 5) driven by suitable motor means, such as an electric motor 22 illustrated in FIG. 1. Referring momentarily to FIGS. 12 and 13, motor 22 drives a gear box having a sprocket wheel 22a for driving a chain 23 (shown in broken lines) which is trained over a sprocket wheel 23a and rotates a further sprocket wheel 24 fixed on a cross shaft 24a. Shaft 24a is rotatably mounted in the supporting structure of the machine and includes suitable sprocket portions 24b at one end thereof for driving a pair of juxtaposed chains 25, which chains are trained over a double sprocket wheel 26 fixedly mounted on a cross-shaft 27. Shaft 27 is rotatably mounted in the supporting structure of the machine and carries sprocket wheels 27a in driving engagement with lower die plate chains 21. For a further explanation of the construction and operation of the package forming machine, reference should be had to the aforementioned application, Serial No. 299,000.

Referring back to FIG. 1, the lower die plates are adapted to receive a continuous sheet of polyvinylidene chloride film 24 on their faces and advance the film in a horizontal linear path through the machine. Film 24 is received by the lower die plates in its supercooled state, which film is formed by suitable film extrusion and supercooling means such as those disclosed in the aforementioned co-pending application and patent. Suitable hold-down roller means 28, diagrammatically shown in FIG. 1, are provided for insuring smooth and co-extensive contact between film 24 and the faces of the lower die plates, which faces are planar and define a substantially continuous horizontal moving surface for advancing the lower film. In effect, the endless series of lower die plates act as a conveyor for advancing lower film 24.

As it will become apparent upon referring to application, Ser. No. 299,000, the articles to be packaged must be accurately spaced or located on the lower film. The present invention includes means in the form of a unique loading conveyor which operate in an inter-related manner with movement of the lower die plates for successively depositing articles on the film being continuously advanced on the lower die plates, the loading conveyor principally comprising loading zone 10.

The loading conveyor generally designated 29, includes means for continuously advancing an endless series of trays 30 in a horizontal course which passes over the lower film obliquely thereto. The loading conveyor includes suitable supporting structure for mounting horizontally disposed, endless confronting upper and lower guide tracks 31 and 32, respectively (FIG. 8). The shape of the guide tracks and their disposition relative to the lower die plates is illustrated in FIG. 2.

The loading conveyor includes a plurality of identical equally spaced-apart tray support members 33 each of which includes upper and lower pairs of integral ear portions 34 mounting upper rollers 35 and lower rollers 36 for being received in respective guide tracks 31 and 32. Both of the lower pair of ears 34 of each support member 33 mount pulleys 37 on their upper surfaces, the pulleys being rotatably mounted on bushing members 38. At least one of the bushing members 38 cooperates with a depending member 39 attached to the underside of the corresponding upper ear 34 for connecting each member 33 with an endless chain 40. Members 38 and 39 have coaxial bores for receiving a pin 41, which pin extends through one of the links in chain 40. Pulleys 37 have annular recesses 37a adapted to receive guide tracks 43 (FIG. 6) which extend in a horizontal plane between the upper and lower guide tracks of the loading conveyor.

It will be apparent that support members 33 are moved in an endless horizontal path by corresponding movement of chain 40. The chain is driven by a sprocket wheel 45 having teeth thereon adapted for meshing engagement with the links of the chain, the sprocket wheel being driven by a vertically extending shaft 46 (FIGS. 1 and 6). Shaft 46 is operatively connected at the lower end thereof with a gear box 47, the gears of which are operated by a sprocket wheel 48 driven by a chain 49, which chain is driven by sprocket wheel 50 fixedly mounted in a cross shaft 51 supporting sprocket wheels (not shown) which are in meshing engagement with chains 21 of the lower die plates. In other words, chain 40 is moved in timed relation with chains 21 for timed movement of trays 30 with the lower die plates.

As best seen in FIG. 8, a wheel 53 is mounted on shaft 46 for rotation with sprocket wheel 45. Wheel 53 engages the annular grooves in pulleys 37 for assisting in guiding support members 33 as they move around the corners of their course defined by the guide tracks of the loading conveyor. In other words, wheel 53 forms a continuation of guide tracks 43 at one bend in the course of movement of the support members. It will be understood that a wheel similar to 53 is rotatably mounted at each bend of the course of movement of members 33.

Each tray support member 33 has a pair of parallel, vertically extending open ended bores 55 for freely receiving a pair of rods 56. The rods are mounted for axial reciprocating movement in bores 55 by a number of bearing assemblies 57. Rods 56 have reduced-in-diameter threaded portions at the lower ends thereof for being received in aperture 58 in an arm member 60. Arm 60 is secured to the lower ends of rods 56 by nuts 61 which hold the arm against the annular shoulders defined on the rods by the reduced-in-diameter threaded portions of the same. Each arm member 60 has one of the trays supported therefrom.

The upper ends of each pair of rods 56 extend above the upper end of the corresponding support member and have a head member 63 secured thereto. It will be understood that head member 63 is secured to the upper ends of both rods of each support member for movement in unison with the rods. Head member 63 has a depending portion with a pin 64 depending therefrom, which pin is adapted to be received in a central vertically extending bore 65 provided in support member 33. A coil spring 66 is contained in bore 65, which spring has the upper portion thereof encircling pin 64 and abutting the depending portion of the head member for constantly urging the same upwardly, thereby constantly urging both rods and the tray secured thereto upwardly relative to the support member. Head member 63 is adapted to be cammed downwardly against the force of spring 66 for moving trays 30 into close proximity with film 24 being advanced on the lower die plates for transfer of articles on the trays to the lower film.

Each head member 63 has cam rollers 67 and 68 extending from opposite sides thereof. As best seen in FIG. 5, cam roller 68 is adapted to be engaged by a cam track 69 as support member 33 begins to travel along the portion of its course over the advancing lower film. Cam track 69 may be moved upwardly (to a position where it will not cam the rollers 68 downwardly) by means of an actuating arm assembly 70, which assembly is supported on a vertically extending plate 71 which is in turn supported from the supporting structure of the loading conveyor. A locking arm assembly 72 is provided for locking assembly 70 in place when cam track 69 is moved down to its operative position for engagement with cam rollers 68. Cam rollers 68 of the head members ride on a continuous horizontal track (not shown), which track is cut-away in the upper surface thereof along its portion extending over the lower film, thereby allowing the head members to be moved downwardly by cam track 69 for camming of trays 30 into close proximity with the advancing lower film 24.

Referring now in particular to FIGS. 6, 7 and 10, each tray 30 will be seen to be generally rectangular in shape having a plurality of diagonally disposed, spaced-apart, grooves 75 defining parallel ribs 76 therebetween. Tray 30 is mounted in a horizontal plane from the lower end of arm 60 by a plurality of threaded fasteners 77, the tray being mounted with respect to support 33 such that grooves 75 are parallel with the course of movement of the tray as it passes obliquely over the lower film being advanced on the lower die plates. The ribs extending to the trailing rear edge of the tray have raised portions at their ends defining co-planar faces 79 which lie in a vertical plane which is perpendicular to the path of movement of the lower film when the trays pass over the latter along the oblique course of the trays. In effect, vertical co-planar faces 79 define abutment means or stop means extending along one trailing edge of the tray.

Conveyor stripper means, generally designated 82, are mounted in alignment with the oblique course of travel of the conveyor loader trays for cooperating with the abutment means on the trays to remove articles from the trays and accurately deposit them onto the moving lower film. The stripper means includes a horizontally disposed stepped bar 83 suspended from a plate 84, which plate is secured to the lower end of a vertically extending plate 85, plate 85 being slidably mounted to one side of plate 71 for vertical reciprocating movement. Cam track 69 is supported from plate 85; actuating arm 70 moves cam track 69 and bar 83 vertically in unison. Bar 83 may be secured to plate 84 by means of threaded fasteners 86, for example. The stepped bar extends over the right side of the lower die plates, as viewed looking downstream, and extends in a direction parallel with the direction of movement of the lower die plates.

The inner stepped side of bar 83, i.e., the side of bar 83, i.e., the side facing the lower die plates, has a plurality of evenly spaced-apart steps defined by side wall portions 87 and front wall portions 88. A depending stripper finger 90 is pivotally secured from each side wall portion 87 by means of a pin 91, which pin has a threaded shank portion threadingly engageable with a complementary threaded bore in bar 83. The mounting of bar 83 and the spacing of the fingers are such that the latter are in alignment with respective grooves in the trays. It will be noted that the total number of fingers exceeds the total number of tray grooves by one. The extra finger, which is located at the downstream end of bar 83, is adapted to have inclined side 92 of each tray pass along one side of this finger during movement of the trays. It will be understood that the lower ends of the fingers pass through grooves 75, relatively speaking, during movement of the trays beneath the conveyor stripper means. Each finger has a vertical face 93 which lies in a vertical plane parallel with the direction of movement of the lower film, all faces 93 of the fingers being co-planar.

The fingers are pivotally mounted on bar 83 in a resilient manner to prevent jamming of the loading conveyor in the event the fingers are not in proper alignment with the grooves or in the event articles on the tray are for some reason prevented from being removed from the trays upon engagement with the fingers. As best seen in FIG. 11, each finger 90 is pivotally mounted at the upper end thereof, as by means of a pin 95, to a horizontally extending bar 96 which extends diagonally across bar 83 and has a lug plate 97 secured to the other end thereof. The outer stepped side of the bar includes a plurality of steps defined by side wall portions 98 and rear wall portions 99, and bar 83 includes a threaded bore 100 in each rear wall portion for threadingly receiving one end of a pin 101. A coil spring 102 circles each pin 101, which spring has one end thereof abutting rear wall portion 99 and the other end thereof abutting one face of lug 97 for normally urging the same into engagement with nuts 103 threadingly engaged on threaded stud portion 101a of pin 101. It should be apparent that if the lower ends of the fingers 90 engage ribs on the tray or articles jammed on the tray, the fingers will rotate, in a clockwise direction as viewed in FIG. 11, thereby allowing passage of the tray or articles for preventing damage to the loading conveyor.

As seen in FIG. 10, a pair of spring clips 105 are secured, as by means of screws 106, to the upstanding portions of a pair of ribs 76 on each tray. These clips have their free ends bent upwardly slightly for engagement with the trailing rear edge portion of an article supported on the trays for holding the article securely on the former. As noted in FIG. 6, the two ribs nearest the corner of each tray which is secured to arm 60 also have upstanding portions 108 at their other ends, i.e., the ends at one of the leading sides of the tray, which upstanding portions each have vertical faces 109 which are contained in a vertical plane parallel with the direction of movement of the lower film. Upstanding portions 108 and faces 109 are substantially identical to upstanding portions 78 and faces 79. A spring clip 110, similar in construction to spring clips 105, is suitably secured to one of the upstanding portions 108, the clip 110 being adapted for engagement with a leading side edge portion of an article supported on tray 30.

The operation of the loading conveyor is as follows:

For purposes of illustration, it will be assumed that slices of bacon are to be deposited on the lower film in longitudinal spaced-part accumulations for being packaged in separate sealed packages by the continuous package forming machine. As seen in FIGS. 4 and 5, bacon slices 112 are stacked in overlapping relation on a rectangular base member 113 which may be made of cardboard or other suitable material. The base member has an integral upstanding flap 114 which may bear suitable indicia. Each base member 113 carrying the articles or bacon strips to be packaged will be hereinafter referred to as the product.

The products may be delivered to the moving loading conveyor 29 by one or more delivery conveyors 116 (shown in phantom lines in FIG. 2) and loaded on trays 30 by hand, for example. Each product is located on one of the trays so that a rear and side edge of base member 113 abuts tray faces 79 and 109, respectively. This is a relatively easy operation to accomplish by hand as it is only necessary to slide or push the products onto the trays toward the corners thereof secured to arms 60. With the products positioned on the trays as just described, the various spring clips 105 and 110 overlie rear and side marginal portions of the product for holding the same in place.

The trays move in the direction of arrows as indicated in FIG. 2. As mentioned above, the trays are moved in timed relation with movement of the lower die plates which support lower film 24, and the trays move in a horizontal course which has a portion passing over the lower film at an oblique angle thereto. The timing between movement of the loading conveyor and the lower die plates is such that the trays move along their oblique course over the lower die plates at a velocity which has a vectorial component with a velocity equal to the velocity of the lower die plates. The reason for this inter-relationship of the velocities of the loading conveyor and lower die plates will become apparent hereinbelow.

As each tray 30 reaches a position along its oblique course over the lower die plates, it is cammed downwardly into close parallel relation with the advancing lower film by reason of the engagement of cam roller 68 with cam track 69. As mentioned above, tray faces 79 are contained in a vertical plane which is perpendicular to the path of movement of the lower film, and tray faces 109 are contained in a vertical plane which is parallel to the direction of movement of the lower film. Accordingly, as each tray passes along its oblique course over the moving lower film, the product supported on each tray will be positioned so that its trailing rear edge extends perpendicular to the direction of movement of lower film and its leading side edge extends parallel to the direction of movement of the lower film. As each tray moves across the film in close proximity with the same, the leading side edge of the product is simultaneously engaged by faces 93 of the first three stripper fingers of the conveyor stripper means. The number of fingers initially engaged will depend upon, among other things, the number of fingers provided on the conveyor stripper means and the size of the products supported on the trays. Engagement of this leading side edge of the product with the fingers fixes the lateral position of the product with respect to the lower film as the fingers prevent further movement of the product in a direction parallel with the direction of movement of the trays along their oblique course.

As the trays move along their oblique course, the product engaged by the stripper fingers commences movement in a direction parallel with movement of the lower film at the instant the product is contacted by the fingers. By virtue of the timed movement between the loading conveyor and the lower die plates, the products begin this movement the instant they are properly longitudinally positioned over the lower film. This movement of the product, which is relative to the tray on which it is still supported, is brought about by the combined action of the stripper fingers and the abutment faces 79 engaging the trailing rear edge of the product. As faces 93 of the stripper fingers are co-planar in a vertical plane which is parallel to the direction of movement of the lower film, these fingers engaging the leading side edge of the product permit movement of the latter only in a direction parallel with movement of the lower film. The engagement of tray faces 79 with the trailing rear edge of the product causes the product to move in a direction parallel to the direction of the lower film as the leading side edge of the product slides along finger faces 93. During this movement of the product, the associated tray slides laterally with respect to the product by reason of movement of the tray along its oblique course. Or in other words, the trailing rear edge of the product slides along tray faces 79 transversely of the lower film. Stated another way, it may be said that the trays slide diagonally or obliquely from beneath the products after the products come into engagement with faces 93 of the stripper fingers.

As the trays move from beneath the products, the latter drop onto the moving lower film. Since the trays move along their oblique course with a velocity which has a vectorial component having a velocity equal to the velocity of the lower film, there is no relative movement between the products and the lower film after the products have been engaged by the stripper fingers. Therefore, the products are smoothly and accurately transferred to the advancing lower film in proper longitudinally spaced-apart relation thereon. It will be understood of course that the timing between the movement of the loading conveyor and the lower die plates is such that each product is deposited on the lower film in its proper position over one of the lower die plates. The lateral position of the products on the lower film is a function of positioning of the stripper fingers, and the longitudinal position of the products is a function of relative tray and lower die plate spacing and velocity.

As each tray is cammed downwardly by cam track 69 into close proximity with lower film 24, the distance between the upper surface of the tray and the lower film is kept at a minimum thereby reducing the likelihood of misalignment of the products as they are transferred from trays 30 to the lower film. After the trays have passed over the advancing lower film, cam rollers 68 roll off cam track 69 allowing the trays to be urged upwardly by springs 66 to their normal position for being reloaded from one of the delivery conveyors 116.

While the invention has been shown in but one form it will be obvious to those skilled in the art that it is not to be so limited, but on the contrary it is susceptible of various changes and modifications without departing from the spirit and scope of the appended claims.

We claim:

1. Means for successively depositing articles on a feed conveyor wherein the feed conveyor travels along a linear horizontal path during a portion of its travel, said means comprising, loading conveyor means for transporting said articles in spaced-apart relationship along a horizontal linear course above said path and obliquely thereto, which loading conveyor means moves along said course in a direction from one side of said feed conveyor to the other side thereof at a velocity having a vectorial component with a velocity equal to the velocity of said feed conveyor along said path, conveyor stripper means fixedly mounted in alignment with the course of said loading conveyor means and adjacent said other side of said feed conveyor, which conveyor stripper means is adapted to engage an article on the loading conveyor means for positioning the article transversely of said feed conveyor, said loading conveyor means being provided with abutment means extending at a right angles to said path and adapted to engage a trailing edge portion of an article carried by the loading conveyor means for cooperating with said conveyor stripper means to cause the article to move relative to said loading conveyor means and at a velocity equal to the velocity of said feed conveyor for transfer of the article to the feed conveyor.

2. The structure according to claim 1 wherein, said loading conveyor means is in the form of a plurality of horizontally disposed, coplanar, spaced-apart trays, each of which trays includes in the top surface thereof at least one groove open at the ends thereof and extending parallel with the course of movement of the trays, and said conveyor stripper means including a depending stripper finger adapted to extend into said grooves as said trays move along said course.

3. The structure according to claim 1 further defined by said loading conveyor means being in the form of a plurality of horizontally disposed, normally co-planar, spaced-apart trays, each of said trays being individually supported for limited vertical reciprocal movement, and means for moving each of said trays downwardly into close parallel spaced relation with said feed conveyor as each tray passes over the former.

4. Means for successively depositing articles on a feed conveyor wherein the feed conveyor travels along a linear horizontal path during a portion of its travel, said means comprising, loading conveyor means for transporting said articles in spaced-apart relationship along a horizontal linear course above said path and obliquely thereto, which loading conveyor means moves along said course in a direction from one side of said feed conveyor to the other side thereof at a velocity having a vectorial component with a velocity equal to the velocity of said feed conveyor along said path, said loading conveyor means including a plurality of horizontally disposed, co-planar, spaced-apart trays, each of which trays is generally rectangular in shape having a pair of opposite sides extending perpendicular to said path, conveyor stripper means fixedly mounted in alignment with the course of said loading conveyor means and adjacent said other side of said feed conveyor, which conveyor stripper means extends in linear relationship along said other side of the feed conveyor and is adapted to engage an article on one of said trays for positioning the article transversely of said feed conveyor, each of said trays being provided with abutment means extending along the trailing side of said sides thereof, which abutment means is adapted to engage a trailing edge portion of an article carried by one of the trays for cooperating with said conveyor stripper means to cause the article to move relative to said last mentioned tray and at a velocity equal to the velocity of said feed conveyor for transfer of the article to the feed conveyor.

5. The structure according to claim 4 wherein, each of said trays includes in the top surface thereof a plurality of grooves open at the ends thereof and extending parallel with the course of movement with the trays, and said conveyor stripper means includes a plurality of spaced-apart, depending fingers adapted to extend into respective grooves as said trays move along said course.

6. Means for successively depositing articles on a feed conveyor wherein the feed conveyor travels along a linear horizontal path during a portion of this travel, said means comprising, loading conveyor means for transporting said articles in spaced-apart relation along a horizontal course above and across said path, conveyor stripper means mounted adjacent the intersection of said path and said course for engaging articles carried by the loading conveyor means, said conveyor stripper means cooperating with said loading conveyor means to cause the articles to move successively relative to said loading conveyor means and with a velocity equal to the velocity of said feed conveyor for transfer of the articles to the feed conveyor.

No references cited.

EVON C. BLUNK, *Primary Examiner.*

A. C. HODGSON, *Assistant Examiner.*